July 2, 1957   H. W. SACHS   2,797,888
VALVE MECHANISM
Original Filed Feb. 3, 1950

INVENTOR
H.W. SACHS
BY
ATTORNEY

United States Patent Office 2,797,888
Patented July 2, 1957

2,797,888

VALVE MECHANISM

Hans W. Sachs, Binghamton, N. Y.

Original application February 3, 1950, Serial No. 142,278, now Patent No. 2,630,875, dated March 10, 1953. Divided and this application March 3, 1953, Serial No. 340,067

2 Claims. (Cl. 251—252)

This invention relates to back water valves for drains and particularly for use in connection with the drains leading to the city sewage lines.

An object of the invention is to overcome and prevent the backing up of water and sewage from the city line into the basement of a house or any industrial installation. In many installations when the city lines are over taxed by heavy rains and the like this sewage water tends to back up into the lines leading to a residence and floods the basements. Many devices have been provided to overcome this problem, but they have not all been satisfactory either due to leakage around the valves or causing the valves to stick so they will not return to their normal positions resulting in many instances where the basements have been flooded.

This invention consists in providing a back water valve which may be associated with a drain pipe, a floor drain or a floor drain trap, and may easily be closed or opened as needed.

The invention consists of certain novel features of construction and combinations of parts which will be hereinafter more particularly described and set forth in the claims.

Figure 1:
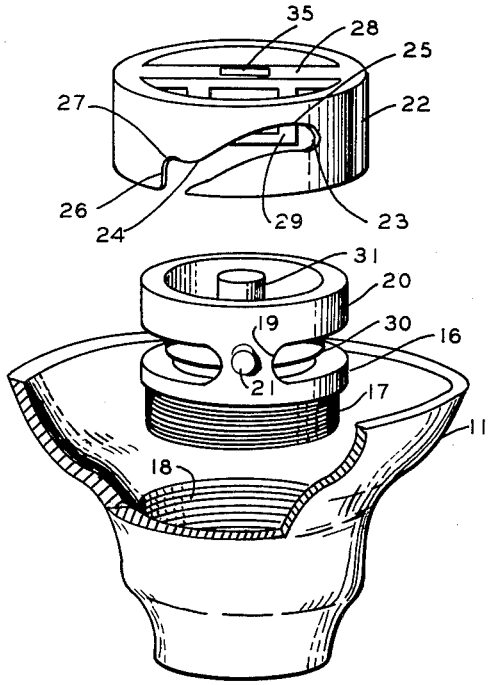
Fig. 1 is an exploded view in perspective of the parts of the valve assembly and a bowl to which it may be applied.
Figure 2:
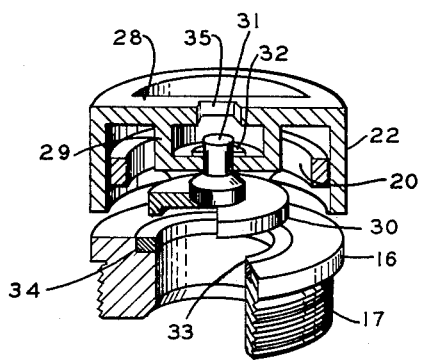
Fig. 2 is a sectional view in perspective of the valve assembly.

The valve assembly consists of a valve body 16 in the form of a cylindrical bushing which is provided on its outer surfaces with screw threads 17 to engage like threads 18 of a basin or bowl 11. Extending upwardly from the upper portion of the valve body 16 are two oppositely disposed arcuate shaped wall portions 19 which are connected together at their upper ends by an annular band 20. Extending laterally and outwardly from each of the wall portions 19 is a stud 21. Encircling the wall portions 19 and annular band 20 is a valve sleeve 22 which is capable of having free movement with respect to the annular band 20. Formed in the wall of the sleeve 22 are two bayonet slots 23—23 which are preferably arranged diametrically opposite one another and spaced 180° apart. The bayonet slots 23 are open at the lower edge or bottom of the sleeve 22 and receive the studs 21 of the wall portions 19 for connecting the valve sleeve to the valve body. The bayonet slots are formed with camming surfaces of a decided pitch as at 24 to effect a drop of the valve sleeve when rotated clockwise or a rise when turned counter-clockwise and these slots are provided with a section of smaller pitch at their upper ends as at 25 to further drop the sleeve slowly when approaching seating position. A vertical guide surface 26 is provided at the lower end of each slot 23, opposite its open end and on the upper wall of the slots, which serves to hold the valve sleeve 22 and valve 16 in open position by the engagement of the studs 21 with the surface 26. As the ring 22 is rotated manually the studs 21 will engage the surface 26 at the open ends of the slots preventing further rotation of the ring, and the studs 21 will support the sleeve 22 by their engagement with the recess 27 in the upper walls of the slots 23.

Figure 3:
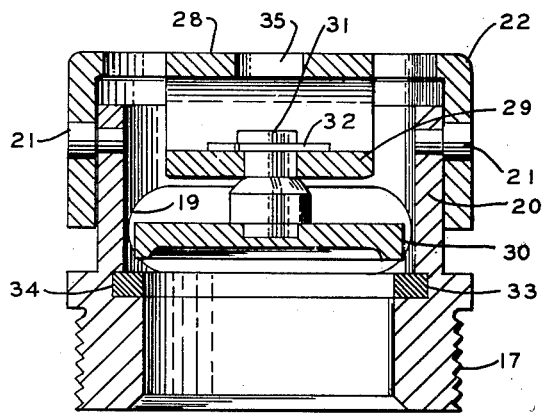
Fig. 3 is a sectional view taken along the center.

A bar 28 extends across the top of the sleeve 22 and extending downwardly within the ring from the bar 28 is a bracket 29. A valve disk 30 provided with a valve stem 31 is attached to the bracket 29 by the stem passing through an opening formed in the bracket and held thereto by retaining ring or key 32 (Fig. 3). The valve disk 30 is capable of having free rotation with respect to its supporting bracket 29 and is adapted to be brought into engagement with a valve seating ring 33 which is preferably made of rubber and cemented in a recess 34 formed in the inner wall of the valve body 16. The bar 28 is provided with a suitably shaped opening 35 for the reception of a tool, which conforms to the opening 35, whereby the sleeve 22 may be operated manually in seating and unseating the valve.

The camming grooves or slots 23 are effective in causing the valve disk 30 to be seated or unseated. The camming grooves 23 have a section 24 of greater pitch to effect drop of the valve sleeve 22 when rotated clockwise, or a rise when turned counterclockwise, and a section 25 of smaller pitch to further drop the sleeve 22 slowly when approaching seating position of the valve disk 30. The cam section 25 having the smaller pitch has an angle whose tangent is smaller than the coefficient of friction for the materials involved, and therefore will be self locking and not permit the valve sleeve 22 to back off under pressure against the valve disk 30. The two camming grooves 23 must be alike within close tolerances and juxtaposed by exactly 180°. A turn of the valve sleeve 22 of less than 60° would cause the valve disk 30 to move from full open position to full closed position, and similarly in moving the valve disk 30 to open position.

In this device the critical valve seating surfaces are located in the precise area of high liquid velocity which prevails whenever the drain serves its purpose of carrying liquids away which flow into basin 11. This high liquid velocity will tend to wipe clean the seating surfaces of the valve disk 30 and seating ring 33, thereby preventing the accumulation of deposits which interfere with the tight closing of the valve.

This is a divisional of my copending application Serial No. 142,278, filed February 3, 1950.

I claim:

1. A drain valve assembly comprising a cylindrical valve body having a valve seat defining an opening coaxial with said body, wall portions extending vertically from said body and bearing laterally protruding studs, a cylindrical sleeve adapted to fit over said wall portions, said sleeve having complementary guide slots accommodating said studs whereby said sleeve is constrained to move axially over said wall portions, said guide slots being open at one end of said sleeve permitting entry of said studs and defining a substantially vertical portion of guide surface and continuing with a laterally extending portion of guide surface having a predetermined slope, and a valve member coaxially supported in said sleeve and adapted to engage said seat, said sleeve being provided with a cross bar having a slot for receiving a key to manually rotate said sleeve, and a bracket below said cross bar, and spaced therefrom, and having said valve member affixed thereto.

2. A valve assembly in accordance with claim 1 wherein the slope of said guide slots is greater in one part than in the other part, whereby upon relative rotational displacement of said sleeve in one direction said valve member is forced toward and into engagement with said seat, the force of said engagement being inversely proportional to the slope of said slots.

References Cited in the file of this patent

UNITED STATES PATENTS

| Number | Name | Date |
|---|---|---|
| 2,988 | Lyman | Jan. 16, 1868 |
| 168,657 | McLaughlin | Oct. 11, 1875 |
| 490,227 | Ferrell | Jan. 17, 1893 |
| 502,635 | Rettig | Aug. 1, 1893 |
| 521,047 | Rubin | June 5, 1894 |
| 980,585 | Barnes | Jan. 3, 1911 |
| 995,903 | Rabiger | June 20, 1911 |
| 1,503,132 | Prator | July 29, 1924 |
| 2,622,770 | Penno | Dec. 23, 1952 |